(12) United States Patent  (10) Patent No.: US 9,176,745 B2
Shirota et al.  (45) Date of Patent: Nov. 3, 2015

(54) PERIPHERAL DEVICE USED WHILE BEING CONNECTED TO INFORMATION PROCESSING APPARATUS

(75) Inventors: Haruhiko Shirota, Hasuda (JP); Hirokazu Higuchi, Fujisawa (JP); Hiroshi Ochiai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 13/419,334

(22) Filed: Mar. 13, 2012

(65) Prior Publication Data

US 2012/0243018 A1  Sep. 27, 2012

(30) Foreign Application Priority Data

Mar. 23, 2011  (JP) .................................. 2011-064809
Mar. 31, 2011  (JP) .................................. 2011-079718

(51) Int. Cl.
*G06F 9/44*  (2006.01)
*G06F 13/10*  (2006.01)

(52) U.S. Cl.
CPC ............ *G06F 9/4411* (2013.01); *G06F 13/102* (2013.01)

(58) Field of Classification Search
CPC .............................. G06F 13/102; G06F 9/4411
USPC ......... 358/1.15, 1.13; 714/E11.136; 707/822, 707/823
See application file for complete search history.

(56) References Cited

U.S. PATENT DOCUMENTS

| 5,915,106 A | 6/1999 | Ard |
| 6,606,669 B1 | 8/2003 | Nakagiri |
| 7,102,783 B2 * | 9/2006 | Morooka et al. ............. 358/1.15 |
| 7,111,121 B2 | 9/2006 | Oishi et al. |
| 7,127,723 B2 | 10/2006 | Endo et al. |
| 7,325,236 B2 | 1/2008 | Kubota |
| 8,127,168 B2 | 2/2012 | Maeda et al. |

(Continued)

FOREIGN PATENT DOCUMENTS

| CN | 1542630 A | 11/2004 |
| CN | 101274143 A | 10/2008 |

(Continued)

OTHER PUBLICATIONS

Japanese Office Action dated Dec. 22, 2014, 2014 in corresponding Japanese Patent Application No. 2011-079718.

(Continued)

*Primary Examiner* — Jacky X Zheng
(74) *Attorney, Agent, or Firm* — Fitzpatrick, Cella, Harper & Scinto

(57) ABSTRACT

A peripheral device is selectively connected to an information processing apparatus including a first operating system and an information processing apparatus including a second operating system whose execution file is incompatible with that of the first operating system. The storage unit of the peripheral device stores a control program to be executed by the information processing apparatus. The control program includes a first control program to be executed on the first operating system and a second control program to be executed on the second operating system. After the peripheral device transmits the control program to the information processing apparatus, the information processing apparatus writes instruction information in the storage unit of the peripheral device in accordance with the control program. The peripheral device operates based on the instruction information.

13 Claims, 8 Drawing Sheets

(56) References Cited

U.S. PATENT DOCUMENTS

| | | |
|---|---|---|
| 8,312,184 B2 | 11/2012 | Ito et al. |
| 8,914,558 B2 | 12/2014 | Ito et al. |
| 2005/0132352 A1 | 6/2005 | Shen |
| 2006/0200629 A1 | 9/2006 | Oishi et al. |
| 2008/0079991 A1* | 4/2008 | Horikoshi et al. ........... 358/1.15 |
| 2008/0242429 A1 | 10/2008 | Itoh et al. |
| 2008/0316522 A1* | 12/2008 | Yokoyama et al. .......... 358/1.14 |
| 2011/0038005 A1* | 2/2011 | Ochiai et al. ................ 358/1.15 |
| 2011/0125937 A1* | 5/2011 | Ito et al. .......................... 710/36 |

FOREIGN PATENT DOCUMENTS

| | | |
|---|---|---|
| JP | 8-161250 A | 6/1996 |
| JP | 10-260927 A | 9/1998 |
| JP | 11-85546 A | 3/1999 |
| JP | 11-126173 A | 5/1999 |
| JP | 2000-235503 A | 8/2000 |
| JP | 2001-202321 A | 7/2001 |
| JP | 2001-243080 A | 9/2001 |
| JP | 2002-55824 A | 2/2002 |
| JP | 2003-150530 A | 5/2003 |
| JP | 2004-54896 A | 2/2004 |
| JP | 2004-334449 A | 11/2004 |
| JP | 2006-24155 A | 1/2006 |
| JP | 2006-323510 A | 11/2006 |
| JP | 2007-280171 A | 10/2007 |
| JP | 2010-113702 A | 5/2010 |
| JP | 2011-191939 A | 9/2011 |
| WO | 2009/004757 A1 | 1/2009 |
| WO | 2009/157500 A1 | 12/2009 |

OTHER PUBLICATIONS

Chinese Office Action dated Jul. 31, 2014 in Chinese Application No. 201210079796.5.

Japanese Office Action dated Jan. 5, 2015 issued in corresponding Japanese Patent Application No. 2011-064809.

"Making a Mac & Windows Compatible and Large Data Recordable USB Memory", Mac 100% Shinyusya Co. Ltd., vol. 5, pp. 14-15, ISBN978-4-88380-957-8, Jul. 2009.

Kinoshita, Kenji, "Sharing an external HDD on Mac and Windows", Mac Fan, ASCII Media Works Co. Ltd., vol. 17, Issue 7, p. 124, Jul. 2009.

* cited by examiner

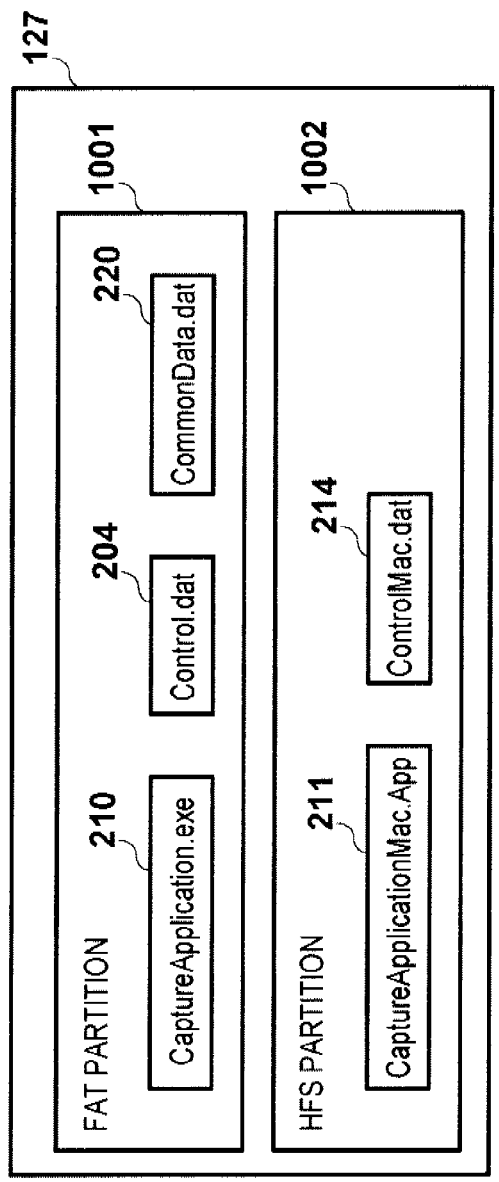
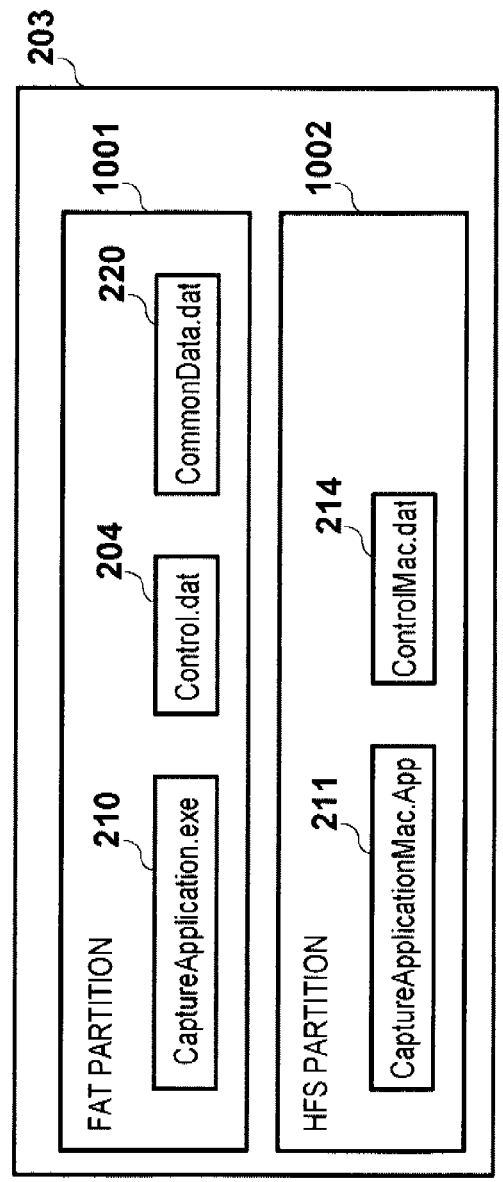
FIG. 3A
FIG. 3B

PERIPHERAL DEVICE USED WHILE BEING CONNECTED TO INFORMATION PROCESSING APPARATUS

BACKGROUND OF THE INVENTION

1. Field of the Invention

The present invention relates to a peripheral device such as an image scanner, a printer, or a multifunction peripheral, an image reading apparatus, and an information processing system.

2. Description of the Related Art

Peripheral devices such as an image scanner, a printer, or a multifunction peripheral have widely been proliferated. To use a peripheral device connected to a computer, a device driver and application software for the peripheral device need to be installed (Japanese Patent Laid-Open No. 2004-334449).

On the other hand, due to the rise of awareness of security, installation of a device driver and application software is limited in some computers. For example, security measures are generally taken to allow a user who has administrator authority to install a device driver but prohibit a general user from installing a device driver and application software. This leads to an increase in inconvenient environments where a peripheral device cannot easily be used.

To improve such an inconvenient environment, there is proposed a technique of making a peripheral device usable without installing a device driver and application software in a computer (Japanese Patent Laid-Open No. 2010-113702).

A plurality of different types of operating systems have become popular in the market. In some cases, one user will use a plurality of operating systems. Such a user may want to use one peripheral device on the plurality of operating systems. Even under this circumference, it would be convenient if the user could use the peripheral device without installing a device driver and application software in the computer.

However, the device driver or application software normally has a different execution file format for each operating system. That is, the device driver or application software has no compatibility with the different types of operating systems. Hence, device drivers, software, and data necessary for the plurality of operating systems need to be installed in the storage device of the peripheral device.

SUMMARY OF THE INVENTION

The present invention provides a peripheral device usable from a plurality of operating systems without installing a device driver and software.

According to the present invention, there is provided a peripheral device for executing predetermined processing based on instruction information from an information processing apparatus. In the peripheral device, a storage unit stores a control program to be executed by the information processing apparatus to control the peripheral device. A control unit controls an operation of the peripheral device based on the instruction information written in the storage unit from the information processing apparatus when the information processing apparatus executes the control program in a state in which the information processing apparatus recognizes a storage area of the peripheral device. The peripheral device is selectively connectable to an information processing apparatus including a first operating system and an information processing apparatus including a second operating system whose execution file is incompatible with that of the first operating system. The storage unit stores, as the control program, a first control program to be executed by the information processing apparatus including the first operating system, and a second control program to be executed by the information processing apparatus including the second operating system.

Further features of the present invention will become apparent from the following description of exemplary embodiments (with reference to the attached drawings).

BRIEF DESCRIPTION OF THE DRAWINGS

FIG. 3A is a block diagram showing the partition arrangement of a ROM 127 in a scanner device 106 and a software configuration stored in the ROM;

FIG. 3B is a block diagram showing the partition arrangement of the ROM 127 in the scanner device 106 and a software configuration stored in the ROM;

DESCRIPTION OF THE EMBODIMENTS

Figure 1:
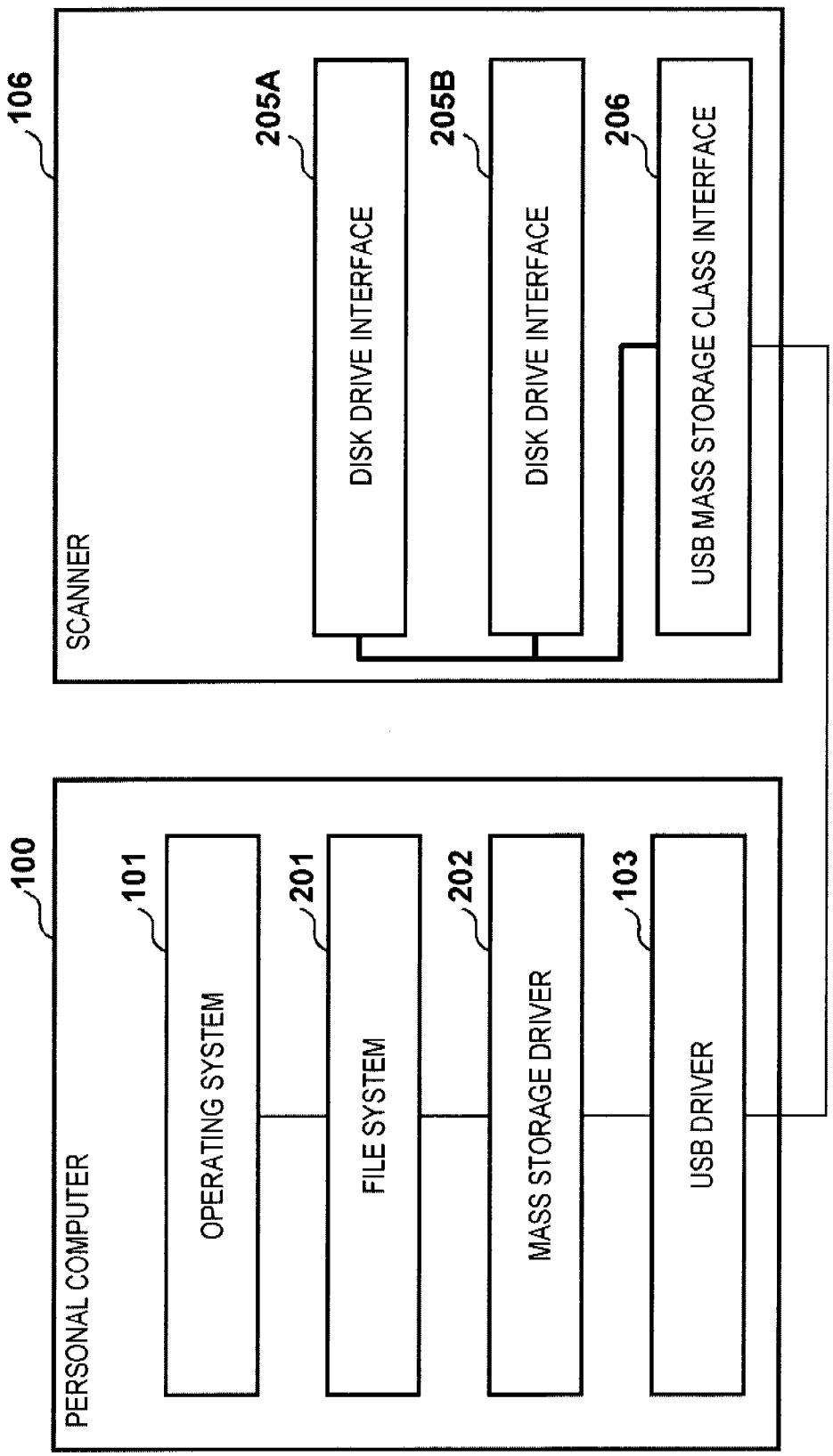
FIG. 1 is a block diagram showing the system arrangement of a computer exemplified as a personal computer and a scanner serving as an image reading apparatus according to the embodiment of the present invention.

FIG. 1 is a block diagram showing the system arrangement of a computer exemplified as a personal computer and a scanner serving as an image reading apparatus according to the embodiment of the present invention.

An operating system 101, a file system 201, a USB mass storage driver 202, and a USB interface driver 103 are installed in a computer 100 that is an example of an information processing apparatus. The operating system 101 is the basic software of the computer 100. The file system 201 is software configured to store files in a storage device such as a hard disk drive. The USB mass storage driver 202 is software configured to control a mass storage such as a hard disk drive, a CD-ROM, a DVD-ROM, a CD-R, a DVD-R, or a USB memory. The USB interface driver 103 is software configured to control a USB device connected to the USB interface. Note that these software programs may be part of the operating system.

A scanner device 106 is an example of a peripheral device to which an information processing apparatus including a first operating system and an information processing apparatus including a second operating system that uses an execution file incompatible with the first operating system are selectively connected. In other words, the scanner device 106 of this embodiment supports multiple OSs and therefore has compatibility with a plurality of operating systems (OSs). The following example will be described assuming that the first operating system is Windows®, and the second operating system is Mac OS®. However, the present invention is not limited to such combination and arrangement.

The scanner device 106 that is an example of a peripheral device for executing predetermined processing in accordance with instruction information from the information processing apparatus includes two USB disk drive interfaces 205A and 205B and a USB mass storage class interface 206. The USB disk drive interfaces 205A and 205B are software programs configured to use a memory (for example, a ROM, a RAM, a flash memory, or an EEPROM) in the scanner device 106 as a disk drive. The USB mass storage class interface 206 is software configured to use the memory as a USB mass storage via the USB disk drive interfaces 205A and 205B.

Note that a general scanner device includes a USB scanner class interface in place of these software programs. For this reason, the personal computer needs to have capture application software and a dedicated scanner driver. In this embodiment, the USB scanner class interface is not always necessary. In addition, the capture application software and dedicated scanner driver are not always necessary on the personal computer side.

Figure 2:
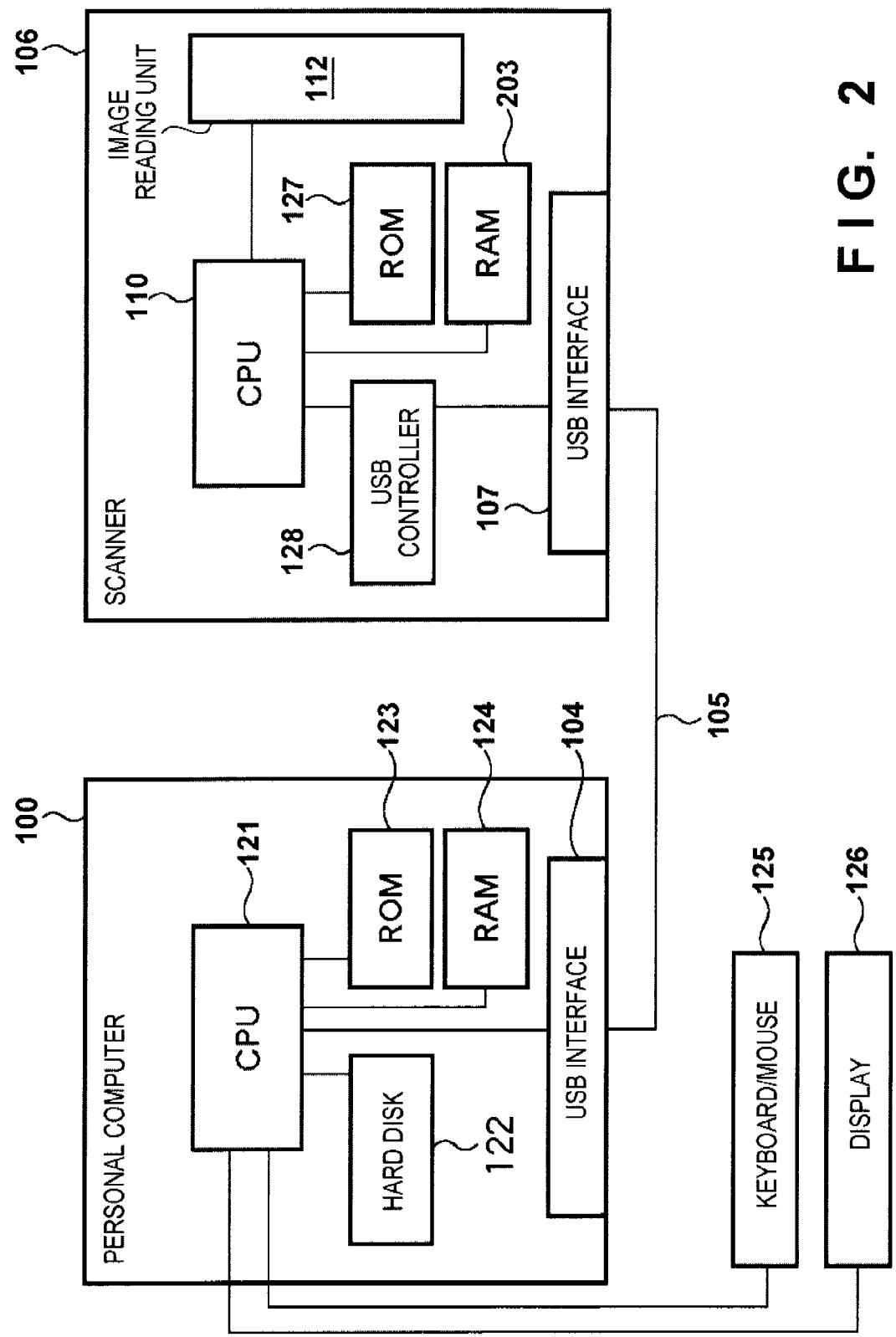
FIG. 2 is a block diagram showing the hardware arrangement of the scanner and the computer exemplified as a personal computer.

FIG. 2 is a block diagram showing the hardware arrangement of the scanner and the computer exemplified as a personal computer. Referring to FIG. 2, the computer 100 includes a CPU 121, a ROM 123, a RAM 124, a hard disk drive 122, and a USB interface 104. The USB interface 104 is connected to the scanner device 106 via a USB cable 105. The CPU 121 is connected to a keyboard/mouse 125 and a display 126.

When the computer 100 is powered on, the CPU 121 activates firmware from the ROM 123 and activates the operating system 101 such as Windows® or Mac OS® from the hard disk drive 122. The operating system 101 may be based on UNIX®. Necessary software programs such as the operating system are loaded to the RAM 124.

On the other hand, the scanner device 106 includes a CPU 110, a ROM 127, a RAM 203, an image reading unit 112, a USB controller 128, and a USB interface 107. When the scanner device 106 is powered on, the CPU 110 activates firmware from the ROM 127. The firmware may be activated from a nonvolatile memory (not shown). The USB controller 128 is a control circuit that supports the USB mass storage class interface 206 and the USB disk drive interfaces 205A and 205B from the hardware side.

When some peripheral device is connected to the USB interface 104 via the USB cable 105, the operating system 101 on the computer 100 accesses the interface of the peripheral device to determine the type of the peripheral device. The scanner device 106 is recognized as a mass storage device class by the operating system 101. This is because the USB mass storage driver 202 that controls the mass storage device class is provided in the computer in advance and need not be installed anew. Hence, the scanner device 106 of this embodiment includes the USB mass storage class interface 206.

The operating system 101 such as Windows® or Mac OS® supports a USB device of mass storage class as standard. When the CPU 121 accesses a USB device of mass storage class, no special device driver or the like need be installed in the computer 100 because the operating system 101 includes a USB driver of mass storage class (USB mass storage driver 202). In addition, standard access to the mass storage class device can be executed using the operating system 101 without administrator authority.

Hence, when the scanner device 106 is connected to the computer 100, the CPU 121 activates the USB mass storage driver 202 installed in advance. In addition, when the scanner device 106 is connected to the computer 100, the CPU 121 and the operating system 101 recognize the scanner device 106 as a mass storage device because the scanner device 106 has the USB mass storage class interface 206. The CPU 121 and the operating system 101 access the ROM 127 and the RAM 203 of the scanner device 106 by regarding them as external storage devices.

The recognition processing will be described in more detail. When the scanner device 106 is connected to the computer 100, the operating system 101 (CPU 121) detects connection of some peripheral device to the USB interface 104, and accesses the USB interface 107 of the scanner device 106 via the USB cable 105. When the USB interface 107 is accessed from the computer 100, the CPU 110 of the scanner device 106 causes the computer 100 to access the USB mass storage class interface 206. The operating system 101 accesses the USB mass storage class interface 206 of the scanner device 106, thereby accessing the scanner device 106 via the USB cable 105 from the USB interface driver 103 and the USB interface 104 using the USB mass storage driver 202 included in the operating system 101 in advance.

The scanner device 106 is recognized as a mass storage class device by the operating system 101. For this reason, the computer 100 can access the scanner device 106 using an access method that does not depend on the presence/absence of administrator authority via the USB interface 107, the USB mass storage class interface 206, and the USB disk drive interfaces 205A and 205B of the scanner device 106. However, the computer 100 can only access the scanner device 106 as a storage device but not directly control the image reading unit 112.

In the scanner device 106, various kinds of files to be used to control it are stored in the ROM 127. Examples are control programs such as capture applications and library files to be executed by the computer 100 and control programs such as firmware to be executed by the scanner device 106 itself. Various kinds of data to be used together with the control programs are also stored in the ROM 127. In this embodiment, a capture application is a program that runs on the operating system 101 of the computer 100 and is not to be executed by the scanner device 106.

The computer 100 forms, in a file folder associated with the file system 201, a table corresponding to the control files and the capture applications stored in the scanner device 106. If the computer 100 cannot recognize the file system, the corresponding table is not formed. For example, a Window®-based operating system cannot recognize an HFS-based file system or a UNIX®-based file system. For this reason, when a partition formatted by a FAT file system and a partition formatted by an HFS file system (HFS+ file system) are stored in the scanner device 106, the Windows®-based operating system recognizes the FAT file system but not the HFS+ file system. On the other hand, the Mac OS®—or UNIX®-based operating system can recognize both file systems.

FIG. 3A is a block diagram showing the partition arrangement of the ROM 127 in the scanner device 106 and a software configuration stored in the ROM. In this embodiment, at least two partitions are allocated in the ROM 127. That is, a FAT partition 1001 is formatted by the FAT file system, which is an example of a first partition accessible by both the first operating system and the second operating system. An HFS+ partition 1002 is formatted by the HFS+ file system, which is an example of a second partition inaccessible by the first operating system but accessible by the second operating system.

In this embodiment, CaptureApplication.exe 210 and CaptureApplicationMac.app 211 are capture applications including a driver program and executed by the CPU 121 of the computer 100 to control image reading. Note that in the following description, the CaptureApplication.exe 210 and the CaptureApplicationMac.app 211 will generically be referred to as capture application unless it is necessary to explicitly point out. The CaptureApplication.exe 210 is an example of a first control program to be executed by the information processing apparatus including the first operating system. The CaptureApplicationMac.app 211 is an example of a second control program to be executed by the information processing apparatus including the second operating system.

Control.dat 204 and ControlMac.dat 214 are control files in which control commands and the like from the computer 100 that is executing the capture application 210 are written to control the scanner device 106. The computer 100 recognizes the scanner device 106 as a mass storage and therefore indirectly controls the scanner device 106 by writing a control command in the control file. Note that in the following description, the Control.dat 204 and the ControlMac.dat 214 will generically be referred to as control file unless it is necessary to explicitly point out.

The CaptureApplication.exe 210 and the Control.dat 204 are files programmed to run on Windows®. The CaptureApplicationMac.app 211 and the ControlMac.dat 214 are files programmed to run on Mac OS®.

CommonData.dat 220 is an example of data to be commonly used by the information processing apparatus including the first operating system and the information processing apparatus including the second operating system. The CommonData.dat 220 is OCR data (character data) to be used in OCR (Optical Character Recognition) that is a function of the capture application.

Independency of OCR data from each operating system will be described here. In general, in OCR, an image acquired by the scanner device 106 is compared with OCR data. Characters are recognized by determining as a result of comparison whether the difference between the image and the OCR data is small. That is, OCR data with the minimum difference to the image acquired by the scanner device 106 is selected from a plurality of OCR data. The OCR data is formed from an image data group to be compared with an image acquired by the scanner device 106. The OCR data becomes larger in proportional to the number of characters to be recognized. For this reason, when supporting various languages, the data size readily becomes enormous.

Figure 9A:
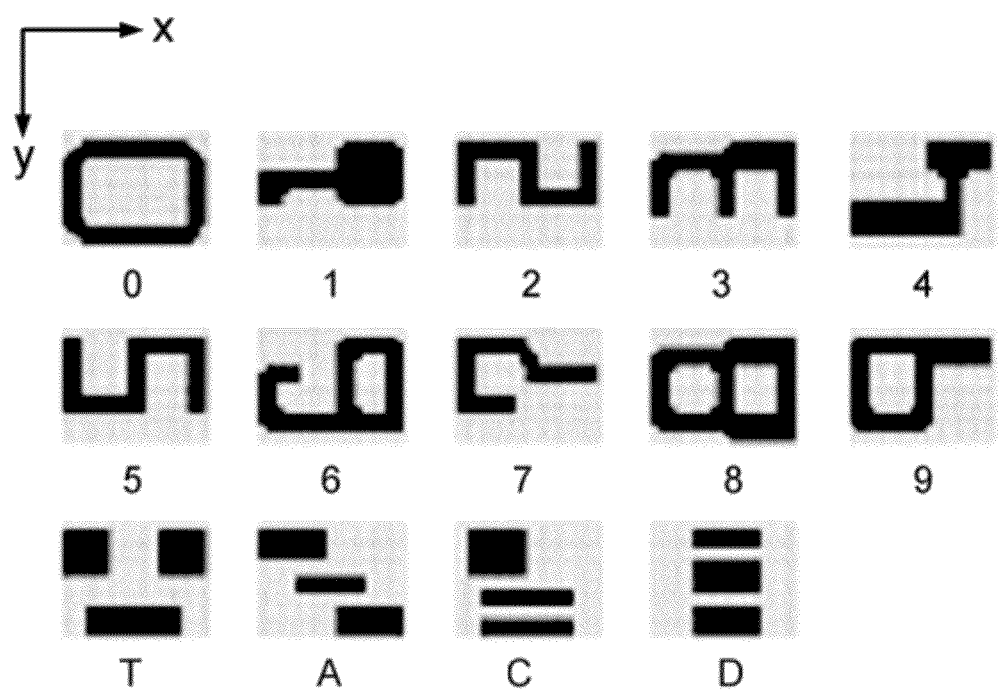
FIGS. 9A and 9B are views showing the structure of OCR data.
Figure 9B:
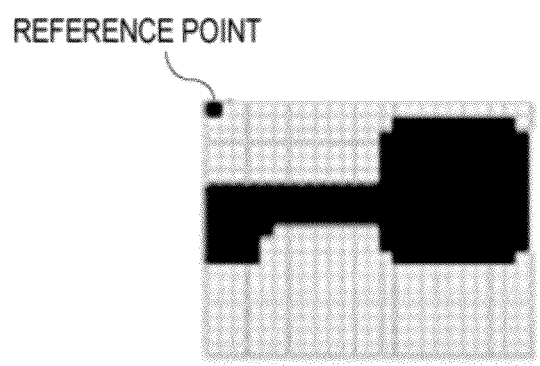

FIGS. 9A and 9B are views showing the OCR data used in OCR. FIG. 9A shows some data of the image data group. FIG. 9B is an enlarged view of the image of a character "1". As shown in FIGS. 9A and 9B, the image group constituting the OCR data is generally provided as an image data sequence in which the character height direction is defined as the x direction, and a direction perpendicular to the x direction is defined as the y direction. That is, the OCR data is binary data formed from a pixel data sequence. The binary data does not depend on the program rule of an operating system. For this reason, the binary data does not depend on each operating system.

The problem is the increase in the program size and the size of data to be used from the programs caused by the above-described expansion of functionality of a device driver and software.

For example, the OCR data is provided as a pixel data sequence. For this reason, the OCR data may be required to include the pixel data of all characters and all fonts to be recognized by the OCR. For example, when the OCR data shown in FIGS. 9A and 9B is formed from pixel data each having one byte, and the recognition target includes all character images of English and Japanese, the file size is very large. As described above, there is concern about an increase in cost caused by an increase in the storage capacity necessary for storing such data. Hence, data that does not depend on the type of the operating system can be shared and commonly used by a plurality of operating systems. For example, the OCR data does not depend on the type of the operating system. Thus, the OCR data can be shared and commonly used by a plurality of operating systems.

Instead of directly making the ROM 127 open on the computer 100, the contents of the ROM 127 may be copied to the RAM 203, and part of the storage area of the RAM 203 may be made open on the computer 100. This allows to suppress alteration of the storage contents of the ROM 127 by the computer 100.

In this case, out of the above-described files stored in the ROM 127, files to be used by the computer 100 are copied to the RAM 203 by the CPU 110. That is, when the scanner device 106 is activated, the CPU 110 creates a drive to make part of the RAM 203 open on the computer 100 in accordance with the firmware. The scanner device 106 is thus recognized by the computer 100 as a drive like a USB memory. The CPU 110 also creates at least two partitions in the drive, formats the two partitions by different file systems, and copies the files from the ROM 127 to the partitions. Note that when the ROM 127 is formed from a flash memory® or EEPROM, copy to the RAM 203 is omitted. The following description will be made assuming that the files are copied to the RAM 203. The RAM 203 is made open as a drive so that the computer 100 and the scanner device 106 can transmit/receive commands and image data through the drive. Since the computer 100 can only recognize the scanner device 106 as a drive, such contrivance would be needed to use the scanner device 106 as an image reading apparatus.

The USB disk drive interface 205A shown in FIG. 1 is designed in correspondence with the FAT partition 1001 formatted by the FAT file system. On the other hand, the USB disk drive interface 205B is designed in correspondence with the HFS+ partition 1002 formatted by the HFS+ file system.

Figure 4:
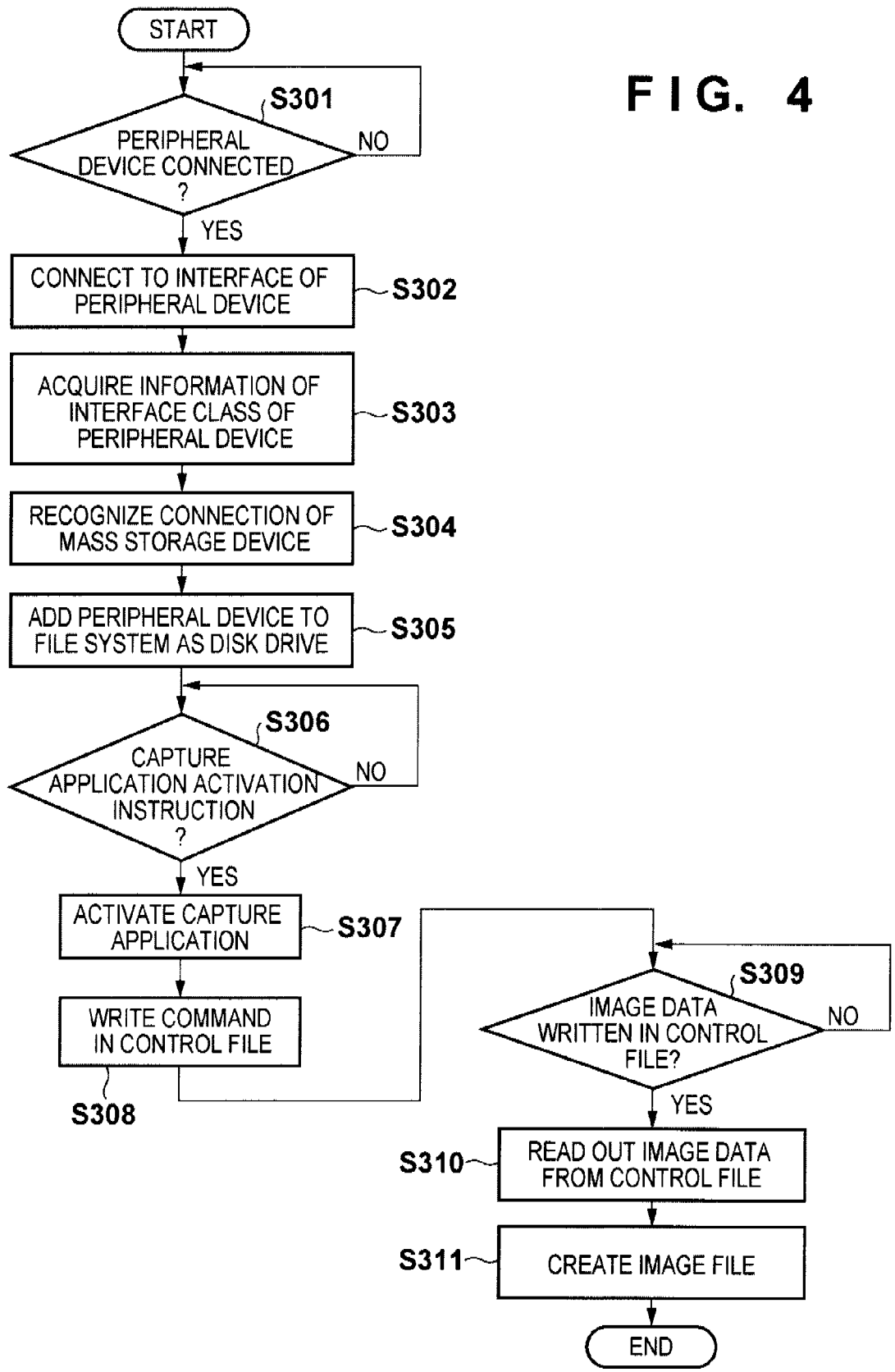
FIG. 4 is a flowchart of a procedure of causing the scanner device 106 to read an image by using a capture application 210 from a computer 100.

FIG. 4 is a flowchart from connection of the scanner device 106 to the computer 100 to image reading by the scanner device 106.

In step S301, the CPU 121 of the computer 100 determines whether the scanner device 106 is connected. In step S302, the CPU 121 is connected to the interface of the peripheral device (scanner device 106). In step S303, the CPU 121 acquires information of the interface class of the peripheral device from the scanner device 106. In step S304, the CPU 121 recognizes the type of the peripheral device from the information of the interface class of the peripheral device. As described above, the scanner device 106 has the USB mass storage class interface 206. Hence, when the scanner device 106 is connected to the computer 100, the CPU 121 recognizes that a USB mass storage device is connected. In addition, the scanner device 106 has the USB disk drive interfaces 205A and 205B as the subclass of the USB mass storage class interface 206. For this reason, the CPU 121 recognizes the connected scanner device 106 as two separate disk drives.

In step S305, the operating system 101 forms, in a file folder associated with the file system 201, a table corresponding to the files stored in the scanner device 106. This enables the CPU 121 to handle each file stored in the scanner device 106 as a file on the disk drive. If the operating system 101 cannot associate the table corresponding to the files stored in the scanner device 106 with the file system 201, the disk drive is not recognized so as to be inoperable.

Figure 5:
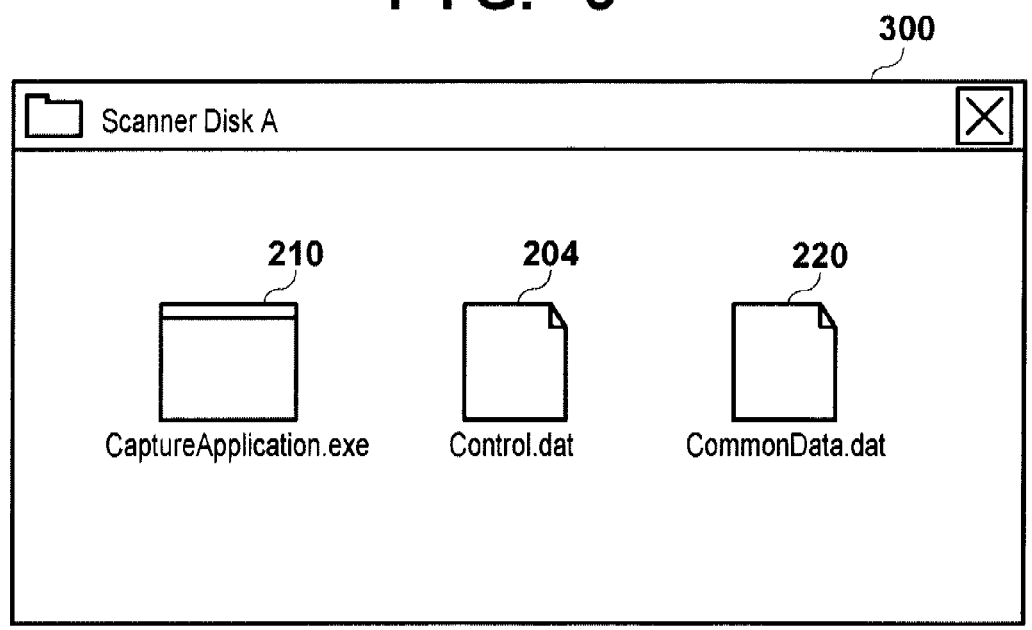
FIG. 5 is a view showing a state in which a FAT disk drive (scanner) is opened by file management software (explorer)

FIG. 5 is a view showing a state in which the disk drive corresponding to the USB disk drive interface 205A is opened by file management software. The FAT partition allocated in the internal memory of the scanner device 106 corresponds to a folder 300.

The folder 300 can be opened using the keyboard/mouse 125 connected to the computer 100. As described above, the USB disk drive interface 205A corresponds to the FAT partition 1001. For this reason, the folder 300 stores the CaptureApplication.exe 210, the Control.dat 204, and the CommonData.dat 220. The FAT partition 1001 is formed by the FAT file system. For this reason, the folder 300 is recognized as the FAT file system by the computer 100.

Figure 6:
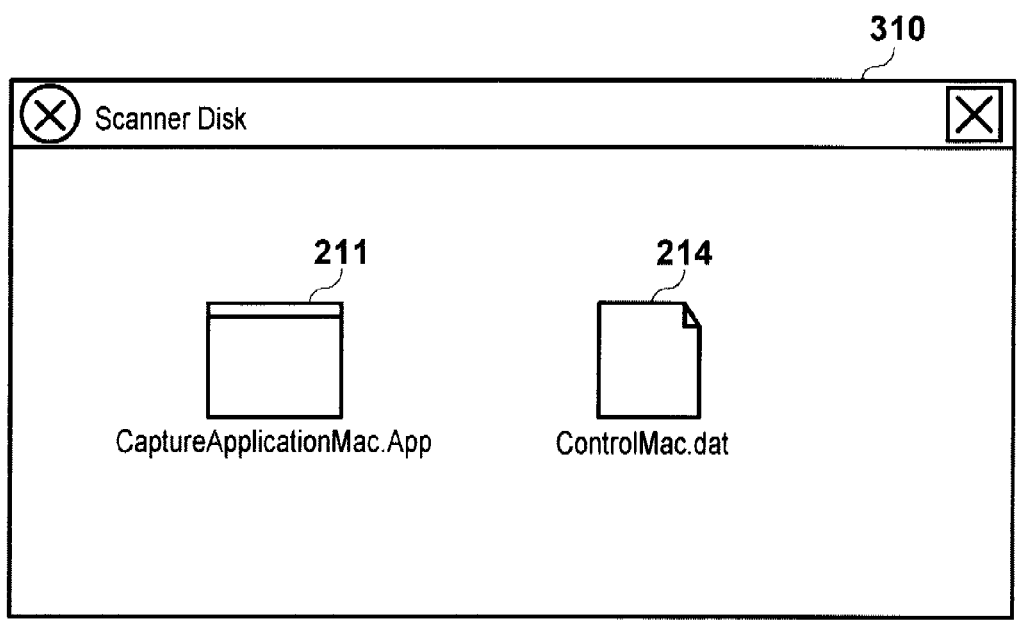
FIG. 6 is a view showing a state in which an HFS+ disk drive (scanner) is opened by file management software (finder)

FIG. 6 is a view showing a state in which the disk drive corresponding to the USB disk drive interface 205B is opened by file management software. The HFS+ partition allocated in the internal memory of the scanner device 106 corresponds to a folder 310.

Like the folder 300, the folder 310 can be opened using the keyboard/mouse 125 connected to the computer 100. As described above, the USB disk drive interface 205B corresponds to the HFS+ partition 1002. For this reason, the folder 310 stores the CaptureApplicationMac.app 211 and the ControlMac.dat 214. The HFS+ partition 1002 is formed by the HFS+ file system. For this reason, the folder 310 is recognized as the HFS+ file system by the computer 100.

An operation performed when the operating system 101 is, for example, Windows® will be described. Windows® supports the FAT file system but not the HFS+ file system. Hence, in Windows®, the folder 300 is recognized in Windows®, and the folder 310 is not recognized. The CaptureApplication.exe 210 is programmed to run on Windows®. Hence, this program is executable on Windows®.

An operation performed when the operating system 101 is, for example, Mac OS® will be described. Mac OS® supports the FAT file system and the HFS+ file system. Hence, in Mac OS®, both of the folders 300 and 310 are recognizable. The CaptureApplicationMac.app 211 is programmed to run on Mac OS®. Hence, this program is executable on Mac OS®. However, the CaptureApplication.exe 210 is not programmed to run on Mac OS®, and this program is inexecutable on Mac OS®.

In step S306, the CPU 121 determines whether an instruction to activate the capture application in the folder 300 is input. This instruction is input by the user from the keyboard/mouse 125. When the instruction to activate the capture application is input, the process advances to step S307.

In step S307, the CPU 121 reads out the capture application from the scanner device 106, loads it to the memory (RAM 124), and activates it. The USB interface 107, the USB controller 128, and the CPU 110 of the scanner device 106 transmit the capture application to the computer 100 in accordance with a read instruction from the computer 100. The USB interface 107 and the like of the scanner device 106 are an example of a transmitting unit that transmits a control program stored in the storage unit to the information processing apparatus. The CPU 121 reads out the OCR data CommonData.dat 220 from the scanner device 106 and uses it in accordance with the activated capture application. For example, when the CaptureApplication.exe 210 is loaded to the memory and activated, it loads the CommonData.dat 220 in the same folder. On the other hand, when the CaptureApplicationMac.app 211 is loaded to the memory and activated, it loads the CommonData.dat 220 in the folder 300. In fact, when the OCR function provided in the capture application has become active, the CPU 121 compares the read image data with the OCR data to execute character recognition. Hence, the OCR data need not always be loaded to the RAM 124. However, loading the OCR data to the RAM 124 leads to improvement of the character recognition processing efficiency.

As described above, the CommonData.dat 220 is a file that is independent of the operating system and exists in the folder 300 created in the partition recognized as the FAT file system. Hence, the CommonData.dat 220 can be recognized from the above-described two operating systems, Windows® and Mac OS®.

When the shared data independent of the type of the operating system is arranged in the partition formatted by the file system commonly recognizable from a plurality of operating systems, the storage capacity of the scanner device 106 can be saved. That is, the storage medium such as the ROM 127 where the applications and configuration files are stored can have a small capacity.

Figure 7:
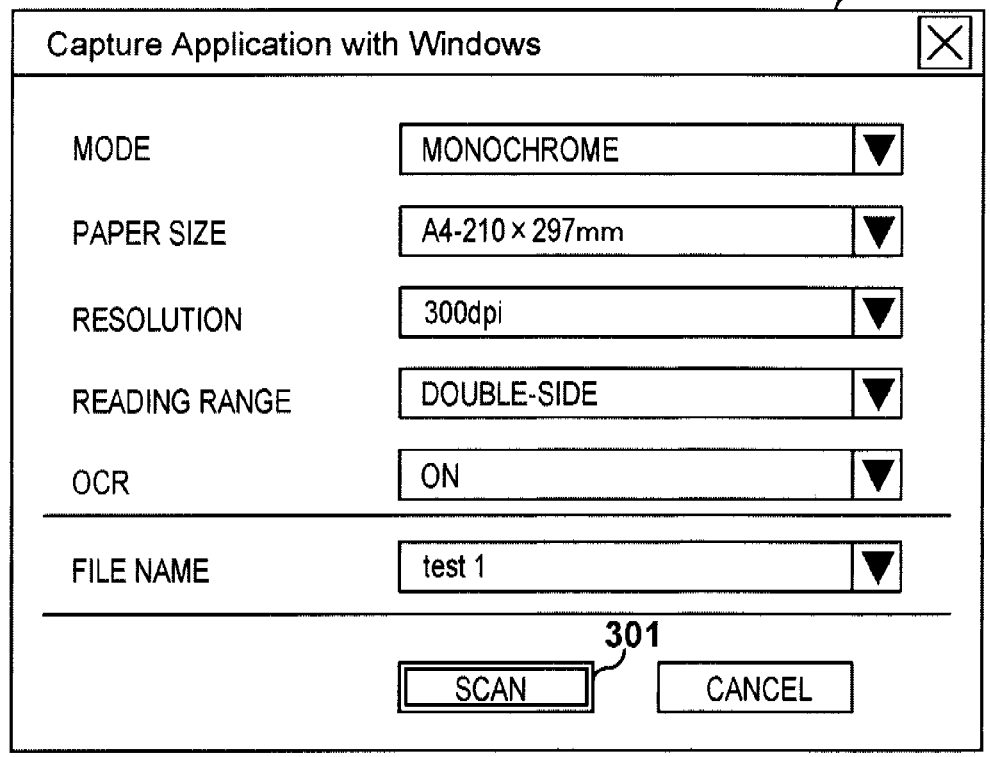
FIG. 7 is a view showing an example of a user interface displayed upon activating the capture application 210.
Figure 8:
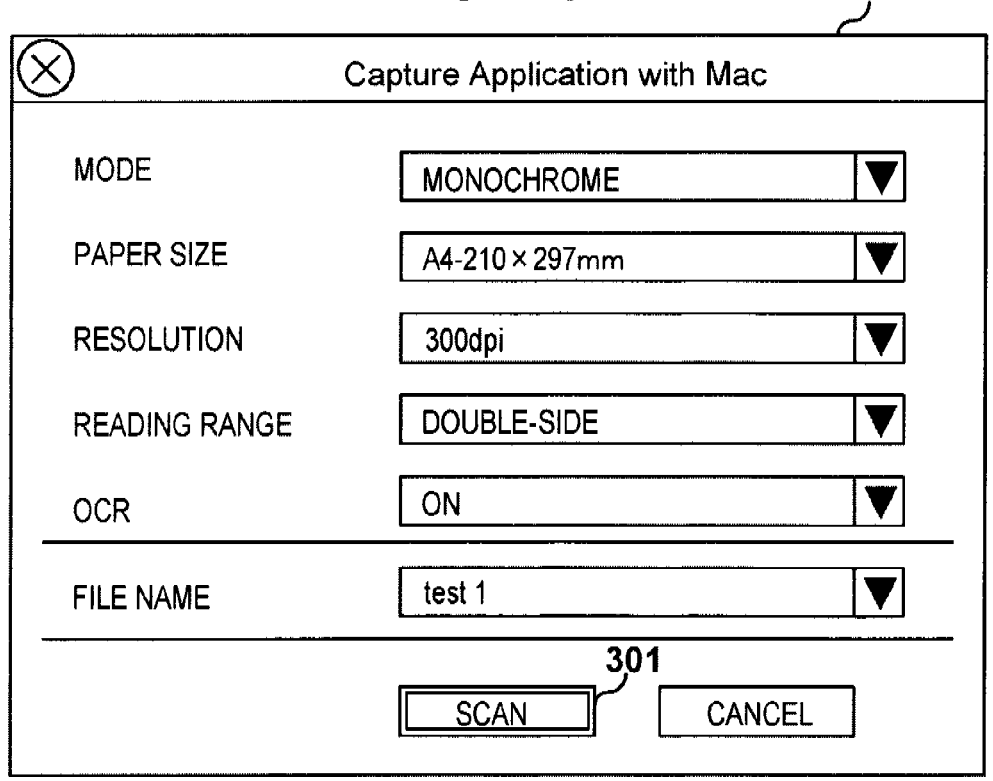
FIG. 8 is a view showing an example of a user interface displayed upon activating a capture application Mac 211.

In this embodiment, the scanner device 106 is controlled based on instruction information transmitted from the computer 100. The instruction information from the computer 100 is written in the storage unit of the scanner device 106 upon software execution by the computer 100. The CPU 110 of the scanner device 106 controls the operation of the scanner device 106 based on the instruction information written in the storage unit. For example, in this embodiment, the computer 100 is connected to the display 126 to display various kinds of user interfaces on it. That is, the computer 100 can actually display a user interface as shown in FIG. 7 or 8 by executing the capture application. The user can appropriately designate the control conditions of the scanner device 106 via the user interface.

FIG. 7 is a view showing an example of a user interface displayed upon activating the capture application 210. FIG. 8 is a view showing an example of a user interface displayed upon activating the capture application Mac 211. Each of the user interfaces shown in FIGS. 7 and 8 displays five items: "mode", "paper size", "resolution", "reading surface", and "OCR". As can be seen from the OCR set item, each of the CaptureApplication.exe 210 and the CaptureApplicationMac.app 211 includes a character recognition program that causes the information processing apparatus to execute character recognition processing. If the settings of the five items need to be changed, the user can change the setting of each item to a desired setting by operating the keyboard/mouse 125. The file name (test1 in this embodiment) of the image file to store the read image is also input by operating the keyboard/mouse 125. Finally, the user clicks a scan button 301 using the keyboard/mouse 125.

When the scan button 301 is clicked via the keyboard/mouse 125, the CPU 121 receives the scan setting (instruction information) and writes it in the control file in the scanner device 106. In step S308, the CPU 121 also writes scan start command data (instruction information) in the control file. The control file is stored in a third partition (example: FAT partition) accessible and readable/writable from a plurality of different types of operating systems. Note that the above-described FAT partition 1001 is a readable/writable partition, the control file is written there. The third partition and the FAT partition 1001 are allocated in the RAM 203 such as a flash memory® or a readable/writable memory portion such as the EEPROM out of the ROM 127. The HFS+ partition 1002 may also be allocated in a readable/writable memory portion such as the EEPROM out of the ROM 127. The RAM 203 or the ROM 127 thus functions as a storage unit that stores the control program to be executed by the information processing apparatus to control the peripheral device.

The CPU 110 of the scanner device 106 monitors the control file. Upon detecting that the scan setting and the scan start command data are written in the control file, the CPU 110 loads the control file, and controls the image reading unit 112 based on the scan setting written in the control file to start scan. When the scanner device 106 starts scan, the CPU 110 writes, in the control file, the image data read by the image reading unit 112. The control file can be either the same as the control file that enables the scan setting or a different file. The CPU 110 thus functions as a control unit that controls the operation of the peripheral device based on instruction information that is written in the storage unit by the information processing apparatus in accordance with the control program executed by the information processing apparatus in a state in which it is connected to the peripheral device. The CPU 110 also functions as a control unit that reads out a reading control command written in the storage unit by the information processing apparatus in accordance with the control program executed by the information processing apparatus, and controls the image reading operation of the image reading apparatus based on the reading control command.

In step S309, the CPU 121 of the computer 100 monitors whether the image data is written in the control file. Upon detecting that the image data is written in the control file, the process advances to step S310.

In step S310, the CPU 121 reads out the image data from the control file. In step S311, the CPU 121 creates a designated image file (fine name "test1" in this embodiment) and stores it in the hard disk drive 122.

To cause the computer 100 to process software such as the CaptureApplication.exe, it may be linked to a library module that allows dynamic linking. The CPU 121 may extract such a library module from the scanner device 106 and load it to the RAM 124.

Figure 10:
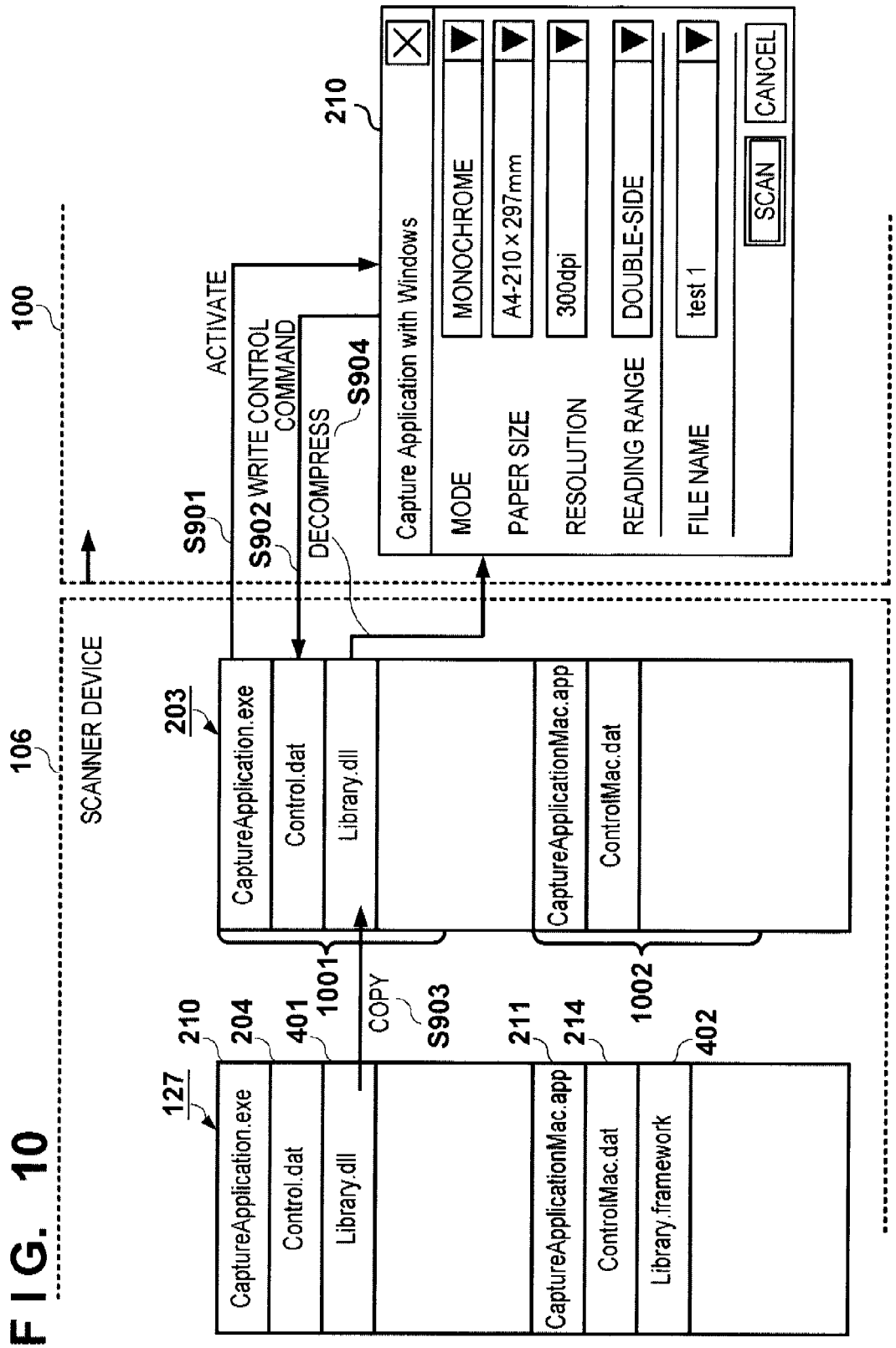
FIG. 10 is a view showing processing of loading a library module from the scanner device 106 to the computer 100 in a case in which an operating system 101 of the computer 100 is Windows®.

FIG. 10 shows processing of loading a library module from the scanner device 106 to the computer 100 in a case in which the operating system 101 of the computer 100 is Windows®. Steps S901 to S904 of FIG. 10 correspond to step S307 of FIG. 4.

As described above, the CPU 110 of the scanner device 106 allocates the FAT partition 1001 and the HFS+ partition 1002 in the RAM 203, and reads out the CaptureApplication.exe 210 and the Control.dat 204 from the ROM 127 and writes them in the FAT partition 1001. The CPU 110 also reads out the CaptureApplicationMac.app 211 and the ControlMac.dat 214 from the ROM 127 and writes them in the HFS+ partition 1002. This enables to use the scanner device 106 regardless of whether the operating system 101 is Windows® or Mac OS®. The ROM 127 is a nonvolatile storage area where the control program is stored. The RAM 203 is a volatile storage area. The CPU 110 also functions as a control unit that reads out the control program from the nonvolatile storage area, stores it in the volatile storage area, and makes the volatile area open on the information processing apparatus as a drive accessible from the information processing apparatus.

In step S901, the CPU 121 of the computer 100 loads the CaptureApplication.exe 210 to the RAM 124 and activates it.

In step S902, the CPU 121 writes, in the Control.dat 204 that is the control file, a command to read out a file from the ROM 127 in accordance with the CaptureApplication.exe 210. This command instructs to read out Library.dll 401 that is a library file stored in the ROM 127 and copy the file to the FAT partition 1001. The CPU 110 of the scanner device 106 monitors the Control.dat 204 that is the control file. The Library.dll 401 can be the CommonData.dat 220. That is, the Library.dll 401 is an example of data commonly usable by a plurality of different types of OSs.

In step S903, upon recognizing that the command is written in the Control.dat 204, the CPU 110 reads out the Library.dll 401 from the ROM 127 and copies it to the FAT partition 1001.

In step S904, the CPU 121 reads out the Library.dll 401 from the FAT partition 1001 and loads it to the RAM 124 in accordance with the CaptureApplication.exe 210. This allows the CaptureApplication.exe 210 to use the Library.dll 401.

Note that the library module such as the Library.dll 401 is a binary file and therefore sometimes has a relatively large size. To reduce the cost of the ROM 127, the Library.dll 401 may be subjected to information compression in advance and then stored in the ROM 127 of the scanner device 106. In this case, when reading out the Library.dll 401 in accordance with the CaptureApplication.exe 210, the CPU 121 decompresses (expands) it and then writes it in the RAM 124.

The library module loading method on Windows® has been described above. On Mac OS® as well, the library module can be loaded in accordance with the same procedure as described above.

More specifically, in step S901, the CPU 121 of the computer 100 loads the CaptureApplicationMac.app 211 stored in the HFS+ partition 1002 to the RAM 124 and activates it.

In step S902, the CPU 121 writes, in the ControlMac.dat 214 that is the control file, a command to read out a file from the ROM 127 in accordance with the CaptureApplicationMac.app 211. This command instructs to read out Library.framework 402 that is a library file stored in the ROM 127 and copy the file to the HFS+ partition 1002. The CPU 110 of the scanner device 106 monitors the ControlMac.dat 214 that is the control file.

In step S903, upon recognizing that the command is written in the ControlMac.dat 214, the CPU 110 reads out the Library.framework 402 from the ROM 127 and copies it to the HFS+ partition 1002.

In step S904, the CPU 121 reads out the Library.framework 402 from the HFS+ partition 1002 and loads it to the RAM 124 in accordance with the CaptureApplicationMac.app 211. This allows the CaptureApplicationMac.app 211 to use the Library.framework 402.

Note that the library module such as the Library.framework 402 is a binary file and therefore sometimes has a relatively large size. To reduce the cost of the ROM 127, the Library.framework 402 may be subjected to information compression in advance and then stored in the ROM 127 of the scanner device 106. In this case, when reading out the Library.framework 402 in accordance with the CaptureApplicationMac.app 211, the CPU 121 decompresses (expands) it and then writes it in the RAM 124.

The peripheral device of this embodiment may be a device such as a printer or multifunction peripheral having an image forming function. Control software such as CaptureApplication.exe may have a driver function of enabling to send a command concerning at least one of image reading and image forming and move image data from the scanner or to the printer or the like by transferring a file on the RAM recognized as a USB memory. The control software may also be linked to another program of a module having a driver function and enable to send a command concerning image reading or image forming and move image data from the scanner or to the printer or the like by transferring a file on the RAM recognized as a USB memory.

As described above, according to the present invention, control programs such as a device driver and software are stored in the peripheral device and transferred to the information processing apparatus. This enables to use the peripheral device without installing the control program in the information processing apparatus. Additionally, since the control program is prepared for each of a plurality of operating systems, the peripheral device can be used from the different operating systems. More specifically, the storage device provided in the scanner device 106 of the present invention stores a first control program (example: CaptureApplication.exe 210) to be executed by an information processing apparatus including a first operating system and a second control program (example: CaptureApplicationMac.app 211) to be executed by an information processing apparatus including a second operating system. Hence, each of the plurality of different types of operating systems can use the peripheral device by accessing the execution file executable by itself.

In the above-described embodiment, the FAT partition 1001 and the HFS+ partition 1002 are allocated. However, only the FAT partition 1001 may be allocated. This is because the FAT partition 1001 is a general-purpose area accessible by almost all operating systems. However, when different partitions are allocated in the RAM 203 for the respective operating systems, functions unique to each operating system can be used. For example, the HFS+ partition 1002 allows the contents of the partition to be automatically displayed using file management software when connected to Mac OS®. In addition, the control files can have the same name. This may be convenient from the viewpoint of management.

The CPU 110 functions as a control unit that analyzes instruction information written in the storage unit by the information processing apparatus, and upon recognizing that the instruction information instructs to write, in a volatile storage area, a predetermined file stored in a nonvolatile storage area, reads out the predetermined file from the nonvolatile storage area and writes it in the volatile storage area, thereby making the predetermined file open on the information processing apparatus. For example, an auxiliary file such as a library module may be read out from the scanner device 106 and used as needed by the software that controls the peripheral device. That is, at the timing the auxiliary file is needed, the computer 100 writes the command in the control file. The scanner device recognizes the command written in the control file and writes the auxiliary file from the ROM 127 to the RAM 203. This allows the computer 100 to use the auxiliary file. Since the RAM 203 need only store the auxiliary file as needed, a larger free space can be ensured.

The predetermined file may be a file that has undergone information compression and is to be decompressed by the information processing apparatus before it reads out the file from the volatile storage area. Information compression of the auxiliary file enables to save the storage capacity of the ROM 127.

In recent years, the program sizes of device drivers and software to use a peripheral device and the sizes of various kinds of data to be used by the programs increase along with the expansion of functionality of the peripheral device. The storage capacity of the storage device provided in the peripheral device is generally not so large from the viewpoint of the manufacturing cost. It is therefore difficult to store the device drivers, software, and various kinds of data, whose sizes are recently growing, in the peripheral device for each of a plurality of different types of operating systems. For example, data files independent of the operating system recently tend to increase the data amount. When the operating systems can commonly use the files, the storage capacity of the peripheral device can be saved.

The present invention provides a peripheral device usable from a plurality of operating systems without installing a device driver and software, an image reading apparatus, and an information processing apparatus with an inexpensive arrangement.

More specifically, according to the present invention, control programs such as a device driver and software are stored in the peripheral device and transferred to the information processing apparatus. This makes the peripheral device usable without installing the control program in the information processing apparatus. In addition, since control programs are prepared in correspondence with the plurality of operating systems, the peripheral device can be used from the different operating systems. Since data independent of the operating system is stored in the peripheral device as common data, the storage capacity of the storage unit can be saved. That is, a peripheral device usable from a plurality of operating systems can be provided with an inexpensive arrangement.

More specifically, the storage device provided in the scanner device 106 of the present invention stores a first control program (example: CaptureApplication.exe 210) to be executed by an information processing apparatus including a first operating system and a second control program (example: CaptureApplicationMac.app 211) to be executed by an information processing apparatus including a second operating system. The storage device also stores data (example: CommonData.dat 220 or Library.dll) to be commonly used by the information processing apparatus including the first operating system and the information processing apparatus including the second operating system. Since the data need not be stored for each of the plurality of different types of operating systems, the storage capacity can be saved, and an inexpensive peripheral device can easily be provided.

Especially, a first partition accessible from the plurality of different types of operating systems stores the first control program for the first operating system, and the data to be commonly used by the first operating system and the second operating system. A second partition stores the second control program for the second operating system. When the shared data is stored in the first partition, the data can easily be shared by the plurality of different types of operating systems.

In addition, when data having a relatively large size, for example, character data (OCR data) to be used for character recognition by the information processing apparatus that executes the character recognition processing program is used as the shared data, a large storage capacity saving effect can be obtained.

The above embodiment has been described assuming that the first operating system is Windows®, and the second operating system is Mac OS®. However, the present invention is not limited to the combination and arrangement and can cope with a combination of a plurality of different types of operating systems (including two or more types) as needed. The operating system may be based on UNIX®. It is possible to store control programs corresponding to, for example, Windows®, Mac OS®, and UNIX® and data to be commonly used in accordance with each combination of the OSs (two or more).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-064809 filed Mar. 23, 2011 and, 2011-079718 filed Mar. 31, 2011, which are hereby incorporated by reference herein in their entirety.

What is claimed is:

1. A peripheral device for executing image forming or image reading, comprising:
   a communication unit that communicates with any of a first information processing apparatus including a first operating system (OS) and a second information processing apparatus including a second operating system (OS) whose execution file is incompatible with the of the first operating system;
   a storage unit including:
   a first storage area configured to store a first control program which is read and executed by the first information processing apparatus including the first operating system when the communication unit is connected to the first information processing apparatus,
   a second storage area configured to store a second control program which is read and executed by the second information processing apparatus including the second operating system when the communication unit is connected to the second information processing apparatus; and
   a third storage area configured to store data to be commonly used by the first information processing apparatus including the first operating system when the communication unit is connected to the first information processing apparatus and used by the second information processing apparatus including the second operating system when the communication unit is connected to the second information processing apparatus, wherein the third storage area is formatted by a file system recognizable by the first operating system and the second operating system;
   a control unit that controls image forming or image reading of the peripheral device based on instruction information written in said storage unit from the first information processing apparatus executing the first control program and using the data when the first information processing apparatus is connected to the communication unit, and controls image forming or image reading of the peripheral device based on instruction information written in said storage unit from the second information processing apparatus executing the second control program and using the data when the second information processing apparatus is connected to the communication unit.

2. The device according to claim 1, wherein
the first storage area is accessible by both the first operating system and the second operating system, and
the second storage area is accessible not by the first operating system but by the second operating system,
wherein the first storage area and the third storage area are the same storage area.

3. The device according to claim 2, wherein
the first storage area is a storage area of a FAT file system, and
the second storage area is a storage area of an HFS file system.

4. The device according to claim 1, wherein the control program causes the information processing apparatus to write the instruction information in the first storage area.

5. The device according to claim 1, wherein
said storage unit includes
a nonvolatile storage area where the first control program, the second control program and the data are stored, and
a volatile storage area including the first storage area, the second storage area and the third storage area, and
said control unit reads out the first control program, the second control program and the data from the nonvolatile storage area, stores the first control program in the first storage area of the volatile storage area, stores the second control program in the second storage area of the volatile storage area, and stores the data in the third storage area of the volatile storage area, and makes the volatile area open on the first information processing apparatus when the first information processing apparatus is connected to the communication unit and the second information processing apparatus when the second information processing apparatus is connected to the communication unit as a drive accessible from the first information processing apparatus and the second information processing apparatus.

6. The device according to claim 5, wherein said control unit analyzes the instruction information written in said storage unit by the first information processing apparatus or the second information processing apparatus, and upon recognizing that the instruction information instructs to write, in the volatile storage area, a predetermined file stored in the nonvolatile storage area, reads out the predetermined file from the nonvolatile storage area and writes the predetermined file in the volatile storage area, thereby making the predetermined file open on the first information processing apparatus or the second information processing apparatus.

7. The device according to claim 6, wherein the predetermined file is a file that has undergone information compression and is to be decompressed by the first information processing apparatus when the first information processing apparatus reads out the file from the volatile storage area when the first information processing apparatus is connected to the communication unit and is to be decompressed by the second information processing apparatus when the second information processing apparatus reads out the file from the volatile storage area when the second information processing apparatus is connected to the communication unit.

8. The device according to claim 6, wherein the predetermined file includes the data to be commonly used by the first information processing apparatus including the first operating system and the second information processing apparatus including the second operating system.

9. An image reading apparatus for executing image reading, comprising:
   a communication unit that communicates with any of a first information processing apparatus including a first operating system (OS) and a second information processing apparatus including a second operating system (OS) whose execution file is incompatible with that of the first operating system:
   a storage unit including:
   a first storage area configured to store a first control program which is read and executed by the first information processing apparatus including the first operating system when the communication unit is connected to the first information processing apparatus;
   a second storage area configured to store a second control program which is read and executed by the second information processing apparatus including the second operating system when the communication unit is connected to the second information processing apparatus; and
   a third storage area configured to store data to be commonly used by the first information processing apparatus including the first operating system when the communication unit is connected to the first information processing apparatus and used by the second information processing apparatus including the second operating system when the communication unit is connected to the second information processing apparatus, wherein the third storage area is formatted by a file system recognizable by the first operating system and the second operating system; and a control unit that reads out a reading control command written in said storage unit from the first information processing apparatus and controls an image reading operation of the image reading apparatus based on the reading control command when the first information processing apparatus executes the first control program and the first information processing apparatus is connected to the communication unit and reads out a reading control command written in said storage unit from the second apparatus and controls an image reading operation of the image reading apparatus based on the reading control command when the second information processing apparatus executes the second control program and the second information processing apparatus is connected to the communication unit.

10. The apparatus according to claim 9, wherein said storage unit includes a nonvolatile storage area where the first control program, the second control program and the data are stored, and a volatile storage area including the first storage area, the second storage area and the third storage area, and said control unit reads out the first control program, the second control program and the data from the nonvolatile storage area, stores the first control program in the first storage area of the volatile storage area, stores the second control program in the second storage area of the volatile storage area, and stores the data in the third storage area of the volatile storage area, and makes the volatile area open on the information processing apparatus as a drive accessible from the first information processing apparatus when the first information processing apparatus is connected to the communication unit and the second information processing apparatus when the second information processing apparatus is connected to the communication unit as a drive accessible from the first information processing apparatus and the second information processing apparatus.

11. The apparatus according to claim 10, wherein said control unit analyzes the instruction information written in said storage unit by the first information processing apparatus of the second information processing apparatus, and upon recognizing that the instruction information instructs to write, in the volatile storage area, a predetermined file stored in the nonvolatile storage area, reads out the predetermined file from the nonvolatile storage area and writes the predetermined file in the volatile storage area, thereby making the predetermined file open on the first information processing apparatus or the second information processing apparatus.

12. The apparatus according to claim 11, wherein the predetermined file is a file that has undergone information compression, is to be decompressed by the first information processing apparatus when the information processing apparatus reads out the file from the volatile storage area when the first information processing apparatus is connected to the communication unit and is to be decompressed by the second information processing apparatus when the second information processing apparatus reads out the file from the volatile storage area when the second information processing apparatus is connected to the communication unit.

13. The apparatus according to claim 11, wherein the predetermined file includes the data to be commonly used by the first information processing apparatus including the first operating system and the second information processing apparatus including the second operating system.

* * * * *

UNITED STATES PATENT AND TRADEMARK OFFICE
CERTIFICATE OF CORRECTION

PATENT NO. : 9,176,745 B2
APPLICATION NO. : 13/419334
DATED : November 3, 2015
INVENTOR(S) : Haruhiko Shirota, Hirokazu Higuchi and Hiroshi Ochiai It is certified that error appears in the above-identified patent and that said Letters Patent is hereby corrected as shown below:

ON THE TITLE PAGE:

Please correct the Assignee name and residence as follows:

(73) Assignee:

"CANON KABUSHIKI KAISHA, Tokyo (JP)" should read --CANON DENSHI KABUSHIKI KAISHA, Saitama (JP)--

Signed and Sealed this
Sixteenth Day of August, 2016

Michelle K. Lee
*Director of the United States Patent and Trademark Office*